April 17, 1951        R. H. COWLES        2,549,429

CLAMP FRAME PRESS

Filed June 12, 1947

INVENTOR
Raymond H. Cowles
BY Evans + McCoy
ATTORNEYS

Patented Apr. 17, 1951

2,549,429

UNITED STATES PATENT OFFICE 2,549,429

CLAMP FRAME PRESS

Raymond H. Cowles, Wabash, Ind., assignor to The General Tire and Rubber Company, Akron, Ohio, a corporation of Ohio Application June 12, 1947, Serial No. 754,289

3 Claims. (Cl. 29—257)

This invention relates to presses and more particularly to portable screw presses of the clamp-frame type.

One of the principal objects of the invention is to provide a generally improved clamp-frame press for use in forcing a cylindrical object into a socket in a support for the cylinder and which includes means for supporting and guiding the cylindrical object as it is forced into the socket. More specifically, the invention seeks to provide a C-clamp frame press which has a trough-like structure at one side for accommodating a cylinder or cylindrical shell as the latter is pushed into the socket.

A further object of the invention is to provide a clamp-frame press for inserting objects such as cylindrical vibration absorbing devices into sockets that frictionally grip the same and which include a thimble to transmit the force of the pressure screw to the outer metal sleeve of the vibration absorbing mount. As a special feature of this aspect of the invention, there is provided guide means which retains the thimble and shock absorbing mount in alignment as the latter is pressed into the socket.

A still further object of the invention is to provide a clamp-frame press which is relatively simple in design and construction and inexpensive to manufacture. Numerous features of construction and novel arrangements of parts will become apparent as the following detailed description of a suitable embodiment of the invention proceeds. This description, in which like parts throughout the several views are indicated by the same numerals of reference, is made in connection with the accompanying drawings wherein.

The press comprises a clamp frame which may be cast metal or preferably assembled from formed metal plates welded in assembled relation. Body portion 1 of flat plate is formed to U-shape by bends and is embraced by a pair of spaced U-shaped reinforcing members 3 and 4 which are disposed in parallel relation. These reinforcements abut the flat body member and are in the nature of external fins or reinforcing ribs.

Figure 1:
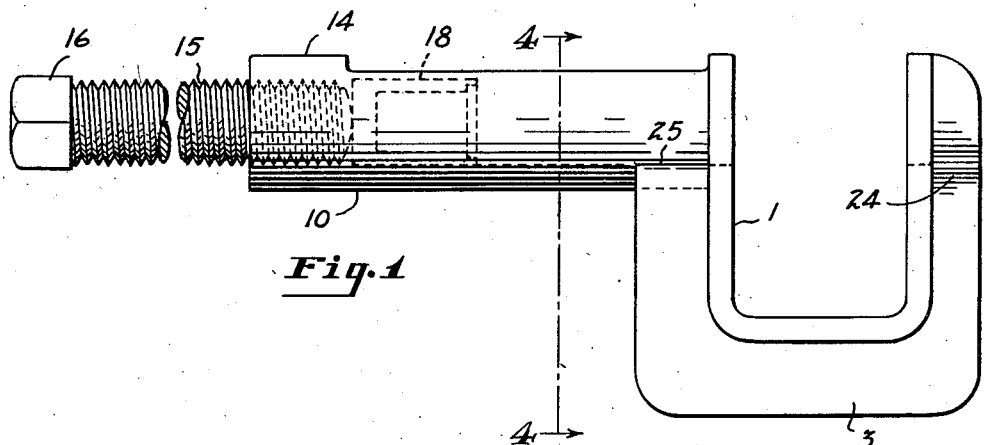
Figure 1 is an elevational view of the clamp-frame press, the pressure screw being foreshortened.
Figure 2:
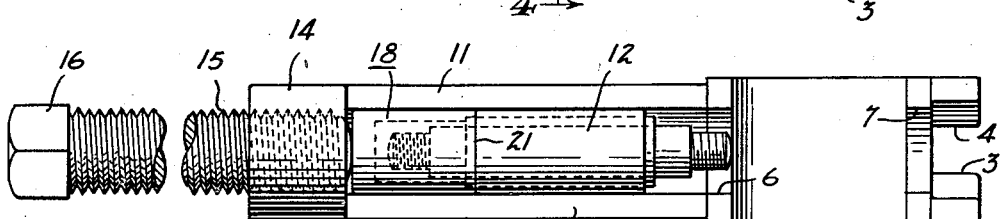
Fig. 2 is a top view of the press showing a cylindrical shock absorbing mounting device positioned in the trough-like guide for insertion into a socket.
Figure 3:
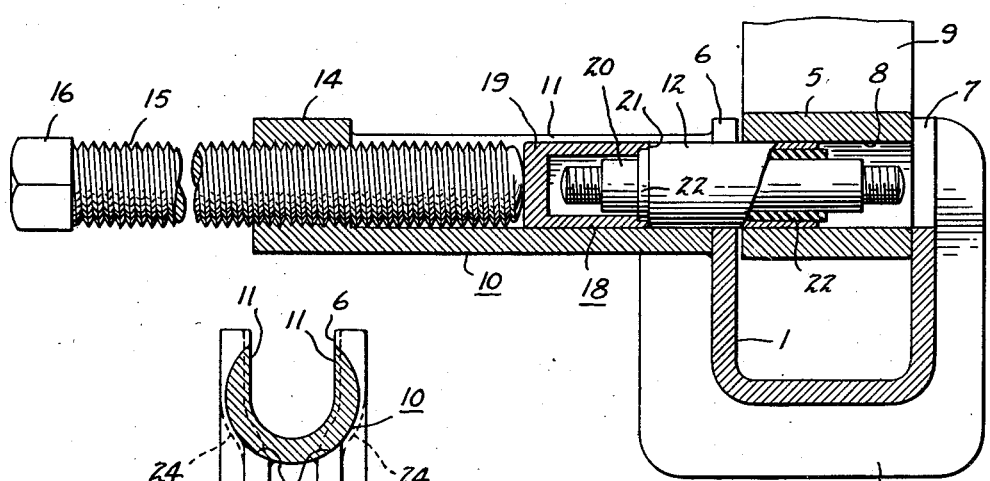
Fig. 3 is a sectional view taken longitudinally through the press and showing the press assembled with a support having a socket for a shock mount device, such a device being shown partially pressed into the socket and the support and shock mount being shown partly in section and with parts broken away and removed.

The clamp-frame press is disposed in use so that the spaced arms thereof straddle a support such as eye 5, Fig. 3, of an automobile spring 9. The ends of the arms of the clamp frame member are each bifurcated providing open ended slots or recesses 6 and 7 which are brought into alignment with cylindrical socket 8 of the spring eye 5. The recesses 6 and 7 thus provide clearances or openings for the passage through the ends of the clamp frame of a cylindrical object such as a vibration absorbing mount into or out of socket 8 of the spring eye.

Figure 4:
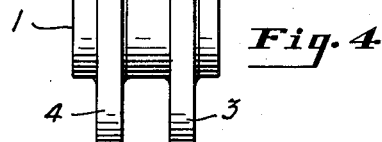
Fig. 4 is a sectional detail taken substantially on the line 4—4 of Fig. 1.

Secured rigidly to one arm of the U-shaped body 1 is a lateral extension or guide member 10 which is in the form of a trough-like structure that serves as a combined support and guide means for an object being pressed across the gap between the arms of the clamp frame. The channel or guideway in the extension 10 is aligned axially with the recesses 6 and 7 and has side walls 11 which contact spaced portions of a cylindrical article such as sleeve 12 of a vibration absorbing mounting device which is to be pressed or forced across the gap between the arms of the clamp frame thus guiding such object for rectilinear axial movement in a predetermined direction with respect to the clamp frame. The bottom of the trough or lateral extension 10 normally supports and guides the object being moved through the press. As shown in Fig. 4 the bottom of the trough-like lateral extension is semicircular in cross section so as to closely surround at least one-half of the cylindrical periphery of the bushing for accurate guiding of the latter.

The end of the lateral extension 10 that is remote from the U-shaped body 1 of the clamp frame is formed with cross member or portion 14 which is internally bored and threaded to receive a screw 15 having a squared end 16 by means of which the screw can be turned for advancing and retracting the same longitudinally through the trough of the lateral extension 10. Thus the screw may be actuated to bear endwise against an object in the trough-like extension to force the same across the gap between the arms of the clamp frame. The provision of openings 6 and 7 in the arms of the U-shaped body portion of the clamp frame, each sufficiently wide to pass the shock mounting device or other object, thus permits the press to be used for either inserting the object into the socket of the support or for pressing the same out of the socket.

To press a shock absorbing mount or spindle into a socket such as the cylindrical recess 8 of the spring eye 5, a thimble 18 is used to advantage. This thimble is of cylindrical cross section to fit snugly within the trough of the lateral extension 10 for longitudinal sliding movement therein. One end 19 of the thimble is of heavy section to withstand the pressure of the screw 15. The other end of the thimble is open to admit center shank 20 of the shock mount into the interior of the thimble. The periphery of the open end of the thimble presents a circumferential shoulder 21 to one end of the sleeve 12 of the shock or vibration absorbing mount. Thus the pressure of the screw 15 is applied by the thimble to the tubular cylindrical sleeve 12 which is frictionally gripped by the cylindrical walls 8 of the spring eye during the insertion of the mounting spindle into the socket. Application of axial pressure to rubber sleeve or cushion 22 which is interposed between the sleeve 12 and the center shank 20 is thus avoided.

One end of each of the reinforcing ribs 3 and 4 abuts the lateral extension 10 at 25 and is integral therewith or welded thereto. The other ends of the reinforcing ribs are formed with bends 24 adjacent the recess 7 so as to pass along opposed sides of the latter.

Articles such as vibration absorbing mounting spindles are customarily held in place in the support therefor by a press fit, the walls of the socket frictionally engaging the cylindrical surface of the outer metallic sleeve of the mounting device. The tight fit employed makes it difficult to start the device into the socket in correct axial alignment therewith. However, the press of the present invention provides a support and guide for the mounting device which holds the same in correct alignment as pressure is applied thereto in forcing the assembly together. One or the other of the flat inner faces of the clamp frame arms engages the support about the socket and correctly positions the lateral extension trough to support the mounting device or bushing in correct confronting relation to the socket which is to receive the same. The operator placing the bushing or mounting spindle in the socket can support the press in one hand, with the bushing or spindle carried in the trough-like extension, and use his other hand to turn the pressure screw.

The principles of the present invention may be utilized in various ways, numerous modifications and alterations being contemplated, substitution of parts and changes in construction being resorted to as desired, it being understood that the embodiment shown in the drawings and described above is given merely for purposes of explanation and illustration without intending to limit the scope of the claims to the specific details disclosed.

What I claim is:

1. A device for pressing an elongated thin walled cylindrical shell into a socket in a support, comprising in combination a frame member for straddling the support, an extension guide member having an elongated trough-like channel of substantially U section rigidly secured at one end to the frame member and extending laterally therefrom for supporting a shell to be pressed axially through and out one end of the channel into the support socket, said extension member having means for engaging circumferentially spaced portions of a supported shell to guide the latter during the pressing thereof, and means associated with the lateral extension member for moving a supported shell axially through the channel of the lateral extension member and for pressing the shell into the support socket.

2. A device for pressing an elongated thin walled cylindrical shell into a socket in a support, comprising in combination a frame member for straddling the support, an extension guide member having an elongated trough-like channel of substantially U section rigidly secured at one end to the frame member and extending laterally therefrom for supporting a shell to be pressed axially through and out one end of the channel into the support socket, said extension member having means for engaging circumferentially spaced portions of a supported shell to guide the latter during the pressing thereof, a thimble slidably movable axially in and guided by the trough-like extension member, and means for so moving the thimble, said thimble being engageable with a shell supported and guided in the trough of the extension member to press endwise against the shell for axial movement of such shell along the channel of the trough-like extension member and into the support socket.

3. A device for pressing an elongated thin walled cylindrical shell into a socket in a support, comprising in combination a frame member for straddling the support, an extension guide member having an elongated trough-like channel of substantially U section rigidly secured at one end to the frame member and extending laterally therefrom for supporting a shell to be pressed axially through and out one end of the channel into the support socket, said extension member having means for engaging circumferentially spaced portions of a supported shell to guide the latter during the pressing thereof, a thimble disposed in the trough-like extension member in slidable engagement with the guide means, said thimble having an open end with a circumferential pressure portion for engaging one end of a supported shell, and a screw threadedly engaged in the other end of the lateral extension member and movable axially through the channel of the latter to bear endwise against the thimble and shell to press the shell into the socket.

RAYMOND H. COWLES.

REFERENCES CITED

The following references are of record in the file of this patent:

UNITED STATES PATENTS

| Number | Name | Date |
|---|---|---|
| 910,961 | Ryrie | Jan. 26, 1909 |
| 2,031,797 | Tarbox | Feb. 25, 1936 |
| 2,121,085 | Krumholz | June 21, 1938 |
| 2,167,897 | Kulp | Aug. 1, 1939 |
| 2,235,643 | Pfauser | Mar. 18, 1941 |
| 2,350,675 | Feldman | June 6, 1944 |